(12) United States Patent
Gebotys (10) Patent No.: US 7,778,419 B2
(45) Date of Patent: Aug. 17, 2010

(54) KEY MASKING FOR CRYPTOGRAPHIC PROCESSES

(75) Inventor: Catherine Helen Gebotys, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1465 days.

(21) Appl. No.: 11/128,206

(22) Filed: May 13, 2005

(65) Prior Publication Data

US 2006/0256963 A1 Nov. 16, 2006

(30) Foreign Application Priority Data

May 10, 2005 (EP) .................................. 05103904

(51) Int. Cl.
*H04N 7/167* (2006.01)
(52) U.S. Cl. .......................... 380/205; 380/28; 713/171
(58) Field of Classification Search ................... 380/43, 380/29, 28, 37, 205; 713/171
See application file for complete search history.

(56) References Cited

U.S. PATENT DOCUMENTS

| 4,706,266 | A | * | 11/1987 | Qayyum ....................... 377/33 |
| 5,479,626 | A | * | 12/1995 | Bindloss et al. ............. 711/212 |
| 6,295,606 | B1 | | 9/2001 | Messerges et al. |
| 6,419,159 | B1 | | 7/2002 | Odinak |
| 6,658,569 | B1 | | 12/2003 | Patarin et al. |
| 2001/0025362 | A1 | * | 9/2001 | Shimada et al. ............. 714/791 |
| 2001/0053220 | A1 | * | 12/2001 | Kocher et al. ................. 380/29 |
| 2003/0044003 | A1 | * | 3/2003 | Chari et al. .................... 380/28 |
| 2004/0071291 | A1 | * | 4/2004 | Romain et al. ................ 380/43 |
| 2005/0008348 | A1 | * | 1/2005 | Collar et al. ................ 386/125 |

OTHER PUBLICATIONS

Kouichi Itoh et al, DPA Countermeasure Based on the "Masking Method", 2002, Springer-Verlag, pp. 440-456.*
Thomas S. Messerges, Securing the AES Finalist Against Power Analysis Attacks, 2001, Springer-Verlag, pp. 150-164.*
Kocher, P., "Differential Power Analysis", Crypto'99, Lecture Notes in Computer Science, 1666, pp. 388-397, 1999, Springer-Verlag.
Chari et al., "Towards Sound Approaches to Counteract Power-Analysis Attacks", Crypto'99, Lecture Notes in Computer Science, 1666, pp. 398-412, 1999, Springer-Verlag.
Itoh, K. et al., "DPA Countermeasure Based on the "Masking Method"", Information Security and Cryptology—ICISC 2001, v 2288, 2002, pp. 440-4546, XP002297044.
Messerges, T. S., "Securing the AES Finalists Against Power Analysis Attacks" Fast Software Encryption. International Workshop, vol. 1978, Apr. 2000, pp. 150-164, XP001040960.
Gladman, Brian, "A Specification for Rijndael, the AES Algorithm", v3.11, Sep. 12, 2003, pp. 1-37 (http://fp.gladman.plus.com/cryptography_technology/rijndael/aes.spec.311.pdf).

* cited by examiner

*Primary Examiner*—Minh Dieu Nguyen
*Assistant Examiner*—Gregory Lane
(74) *Attorney, Agent, or Firm*—Etienne de Villiers; Dimock Stratton LLP (57) ABSTRACT

Countermeasures for differential power or electromagnetic analysis attacks are provided with the definition and use of key encryption masks and masked substitution tables in a cryptographic process. Different key encryption masks and masked substitution tables are applied to different portions of masked keys used in the cryptographic process and are rotated as the cryptographic operations are carried out. The rotation of the key encryption masks and the masked substitution tables is non-uniform. Input and output masking for the substitution tables is provided.

20 Claims, 2 Drawing Sheets

KEY MASKING FOR CRYPTOGRAPHIC PROCESSES

FIELD OF THE INVENTION

This invention relates generally to computing systems and, more particularly, to computing systems implementing encryption operations and countermeasures to resist power analysis attacks on such operations.

TECHNICAL BACKGROUND

Computing systems often require operations to be carried out in a secure manner. For embedded computing devices and for pervasive systems, security of operation is often crucial. To ensure operations and communications are secure, such systems employ cryptographic methods.

The implementation of such a cryptographic method must itself be secure. However, cryptographic methods are subject to attacks. One type of non-invasive attack on computing devices implementing cryptographic methods is known as a power analysis attack. A power analysis attack involves the monitoring of the power consumption of one or more components of a device while the device executes a cryptographic method.

The data derived from monitoring power consumption of the device, combined with knowledge of the operations being carried out by the device, are used to derive the secret information that is part of the cryptographic method.

One type of power analysis attack is known as a Differential Power Analysis ("DPA") (see, for example, "Differential Power Analysis", P. Kocher, CRYPTO'99, Lecture Notes in Computer Science, 1666, pp. 388-397, 1999, Springer-Verlag). This approach involves generating a large number of inputs by varying different bits in values to be encoded using the cryptographic method implemented in a device. The DPA attack monitors power consumption at different points in a computing device for each of these varying values and, by statistical analysis, the differential data is used to determine a likely key value for the cryptographic method (the secret information).

DPA attacks may target the input or the output of Substitution tables (also referred to as substitution boxes or "S-boxes") that are common in cryptographic algorithms and are often implemented as look up tables. An S-box is typically indexed by a combination of key bits and plaintext. In carrying out an attack to determine a key value used in a cryptographic system, an attacker controls the plaintext values and makes guesses at the key bits. Based on these guesses, computations are performed on the acquired power traces to form a set of DPA data. The DPA data with the largest peak value is used to determine which of the key bit guesses was likely correct. As will be appreciated by those skilled in the art, another type of attack is based on electromagnetic analysis of the device carrying out a cryptographic process. Although the description below references power attacks, it will be appreciated that electromagnetic analysis attacks may raise the same issues.

There are several known countermeasures for this S-box DPA attack. Messerges ("Securing the AES Finalists Against Power Analysis Attacks", T. Messerges, FSE 2000, Lecture Notes in Computer Science, 1978, pp. 150-164, 2001, Springer-Verlag) identifies a method of frequently regenerating tables with a different random output mask within the cryptographic algorithm. However, such an approach includes a potentially large overhead cost for each regeneration step. To improve the latency overhead required to regenerate the tables, Itoh ("DPA countermeasure based on the 'masking method'", K. Itoh et al., ICICS 2001, Lecture Notes in Computer Science, 2288, pp. 440-456, 2001, Springer-Verlag) suggests using a fixed number of fixed values to mask the substitution tables. Different substitution tables may be pre-defined and the different tables used at different times in the cryptographic system. However, in the system disclosed in Itoh, the same mask is used for all round keys during each invocation of the cryptographic process. Further, there is a potential for an attacker to obtain information by using simple power analysis to identify cryptographic processes which utilize the same mask. Hence an attacker who determines one mask and has access to masked round keys (for example, through a $1^{st}$ order differential power analysis), may be able to obtain all bits of the master key and all round keys. In such approaches, when the mask is determined by an attacker, the entire master key is placed at risk.

A further approach involves the duplication method described in Patarin (U.S. Pat. No. 6,658,569, Patarin et al., "Secret key cryptographic process for protecting a computer system against attacks by physical analysis") that targets secret sharing schemes where multiple inputs to the S-box are supported. The multiple inputs to the table are transformed into a variable v. Additionally two table outputs are produced: one is a random transformation on the input, A(v), and another is A(v) exclusive-or'd with S(v). However, since the random transformation on v does not change in the Patarin approach, there is a threat that over time an attacker may determine the random transformation used. Furthermore, since A(v) is output from the table, there is a potential for an attacker to obtain information by using second order power analysis (using power samples of A(v) and A(v) exclusive-or'd with S(v)) to obtain a correct key guess.

It is possible to implement either the Itoh or the Patarin approaches in which differing masked tables or transformations are used. However, the use of such multiple masked tables or transformations requires additional memory, power and processor resources that are not always available and the allocation of which is typically not desirable.

It would therefore be advantageous to implement substitution table masking countermeasures for resisting DPA attacks using varying table input and output masking values where such countermeasures do not require repeated table regenerations or transformation redefinition and in which different masks are used for different round keys.

BRIEF DESCRIPTION OF THE DRAWINGS

In drawings which illustrate by way of example only a preferred embodiment of the invention.

DETAILED DESCRIPTION

According to an aspect of the preferred embodiment there is provided an improved countermeasure for a cryptographic process or system.

According to a further aspect of the preferred embodiment, there is provided a method and system that includes the rotation of fixed value masks and of associated masked substitution tables in a cryptographic process. In accordance with other aspects of the invention, such rotated masks for substitution tables may be used in cryptographic operations carried out in accordance with the AES (Advanced Encryption Standard) and DES (Data Encryption Standard) approaches known to those in the art.

In accordance with an aspect of the invention, there is provided a computing device-implemented method for use in iterative cryptographic operations utilizing masking of key values and substitution tables, the method including the steps of:

initially masking an initial key value, initially defining a set of non-uniform key encryption masks, initially defining a set of masked substitution tables, each masked substitution table being derived from an initial substitution table so as to correspond to one of the set of key encryption masks, iteratively carrying out the cryptographic operations, such that each iteration of the cryptographic operations includes the step of defining a successive masked key value by masking the previous masked key value using a key encryption mask selected from the set of key encryption masks, and each iteration of the cryptographic operations utilizes the successively defined masked key value and the corresponding table from the set of masked substitution tables.

In accordance with an aspect of the invention, there is provided the above computing device-implemented method in which the step of defining a successive masked key value includes the step of selecting a key encryption mask from the set of key encryption masks by randomly selecting a mode for stepping through the set of key encryption masks from one of: increment mode, decrement mode, no change mode and double increment mode.

In accordance with an aspect of the invention, there is provided the above computing device-implemented method in which each successively defined masked key value is included of split key values and the set of key encryption masks is defined to permit masking of each one of the split key values.

In accordance with an aspect of the invention, there is provided the above computing device-implemented method in which the iterative cryptographic operations are rounds and in which the split key values are split round key values.

In accordance with an aspect of the invention, there is provided the above computing device-implemented method in which the rounds are rounds in an Advanced Encryption Standard process or in a Data Encryption Standard process.

In accordance with another aspect of the invention, there is provided a computing device-implemented method for successively masking a key value, the successively masked values being for use in successive iterations of cryptographic operations utilizing a substitution table, the method including the initial steps of:

splitting the key value into a set of split key values, defining a set of random mask values, combining multiple random mask values to define non-uniform key encryption masks and masking the set of split key values with selected key encryption masks to define a set of masked keys for use in the iterative cryptographic operations, and combining multiple random mask values related to the key encryption masks to define non-uniform table masks and generating a set of masked tables derived from the substitution table and corresponding to the set of split key values, for use in the iterative cryptographic operations, the method further including, for each iteration of the cryptographic operation, the step of utilizing selected key encryption masks and masked tables, the selection being carried out by a rotation through the respective sets of key encryption masks and masked tables.

In accordance with an aspect of the invention, there is provided the above computing device-implemented method in which the step of selecting the elements in the set of key encryption masks and the set of masked tables further includes random selection of a mode of rotation from a set of potential rotation modes.

In accordance with an aspect of the invention, there is provided the above computing device-implemented method in which the set of potential rotation modes includes two or more of increment, decrement, no motion and double increment modes.

In accordance with an aspect of the invention, there is provided the above computing device-implemented method in which the masking to generate the masked tables is an input masking, the method further including the step of defining output masks for each of the masked tables, the values of the output masks being defined such that the output masks cancel when used in the cryptographic operations.

In accordance with an aspect of the invention, there is provided the above computing device-implemented method in which the definition of the key encryption mask includes the steps of defining a set of non-uniform initial mask values for application to the split mask values, defining a set of non-uniform rotational mask values, the rotational mask values being applied after the initial mask values and the resulting masked values being available to replace the set of masked key values, and defining a set of tuples of unmasking values defined such that in combination, the tuples of unmasking values cancel each of the initial mask values.

In accordance with an aspect of the invention, there is provided the above computing device-implemented method applied to an AES cryptographic operation.

In accordance with another aspect of the invention, there is provided a computing device program product for carrying out iterative cryptographic operations utilizing an initial key value and a substitution table, the computing device program product including a computer device usable medium having computer device readable program product code embodied in the medium, and including program code operative to carry out one or more of the above methods.

In accordance with another aspect of the invention, there is provided a computing device including a memory medium for storing program code executable on the computing device, the memory medium of the computing device storing program code executable on the computing device for carrying out one or more of the above methods.

Advantages of the preferred embodiment include the use of multiple masked sets of substitution tables in each invocation of a cryptographic process. Advantages including providing different masks for different bytes and/or words in a key used in a cryptographic process. Further, for cryptographic processes using keys and round keys, it is not necessary to store all masked versions of keys and round keys. Advantageously, a single masked version of each round key may be stored and according to an aspect of the invention, the mask for each round key varies randomly with each invocation of the cryptographic process as the re-masked round key overwrites the previously masked round key.

A further advantage of an aspect of the preferred embodiment is that state-dependent masking is supported by the value of the rotated masks and masked tables being dependent on the state of the masks prior to rotation. Hence information gained by an attacker concerning the type of rotation performed does not directly lead to information on the masking. Advantages include the implementation of varying masks for substitution tables that permits reduced overhead in energy, performance and program code. Such reduced overhead permits the use of this countermeasure approach with devices such as wireless mobile devices where security is required for the operations carried out by the devices but in which constraints on power and processor performance are potential concerns.

In different cryptographic operations implemented in computing devices, substitution tables are used. For example in AES and in Triple DES ("3DES"), multiple S-boxes are utilized in encryption of plaintext. To provide countermeasures for security attacks on such cryptographic operations the input and the output of such substitution tables may be masked. The security provided by such a masking of the table output may, however, itself be subject to attack.

The preferred embodiment may be implemented as a computer program product that includes program code that operates to carry out the steps in the process described. The preferred embodiment may be implemented as a computer system (which includes a subsystem or system defined to work in conjunction with other systems) for encryption that includes elements that execute the functions as described. The computer system of the preferred embodiment may be defined by, and the computer program product may be embodied in, signals carried by networks, including the Internet or may be embodied in media such as magnetic, electronic or optical storage media. The process described may be implemented in a computing device as a method to be carried out by a combination of computing code and hardware embodied in the computing device (the process being in this case a computing device-implemented method). Computing devices on which the preferred embodiment is able to be implemented include full-featured computers, mobile devices such as wireless mobile devices, and other devices incorporating computing system technology.

The preferred embodiment is described with reference to encryption steps for the AES encryption process. However, it will be appreciated that the preferred embodiment may be implemented with respect to decryption processes and to other iterative cryptographic processes that include keys and substitution tables and for which countermeasures for attacks such as DPA are desirable. The iterative nature of the cryptographic processes described may arise from a single encryption or decryption process (such as where rounds are carried out as exemplified in the AES process referred to below). Another way in which a cryptographic process has an iterative aspect is where the cryptographic process is used successively to encrypt or decrypt. In either case, there is a set of steps that is subject to iteration and over which set of steps the masking described herein is able to be carried out.

It will be appreciated by those skilled in the art that the masking referred to in the description of the preferred embodiment is carried out by the use of a bit-wise exclusive-or operation (XOR) with respect to different values expressed in a binary format. However, other masking operations may be used. For example arithmetic masking (involving the use of addition and/or subtraction in place of the exclusive-or operation) may alternatively be used.

Figure 1:
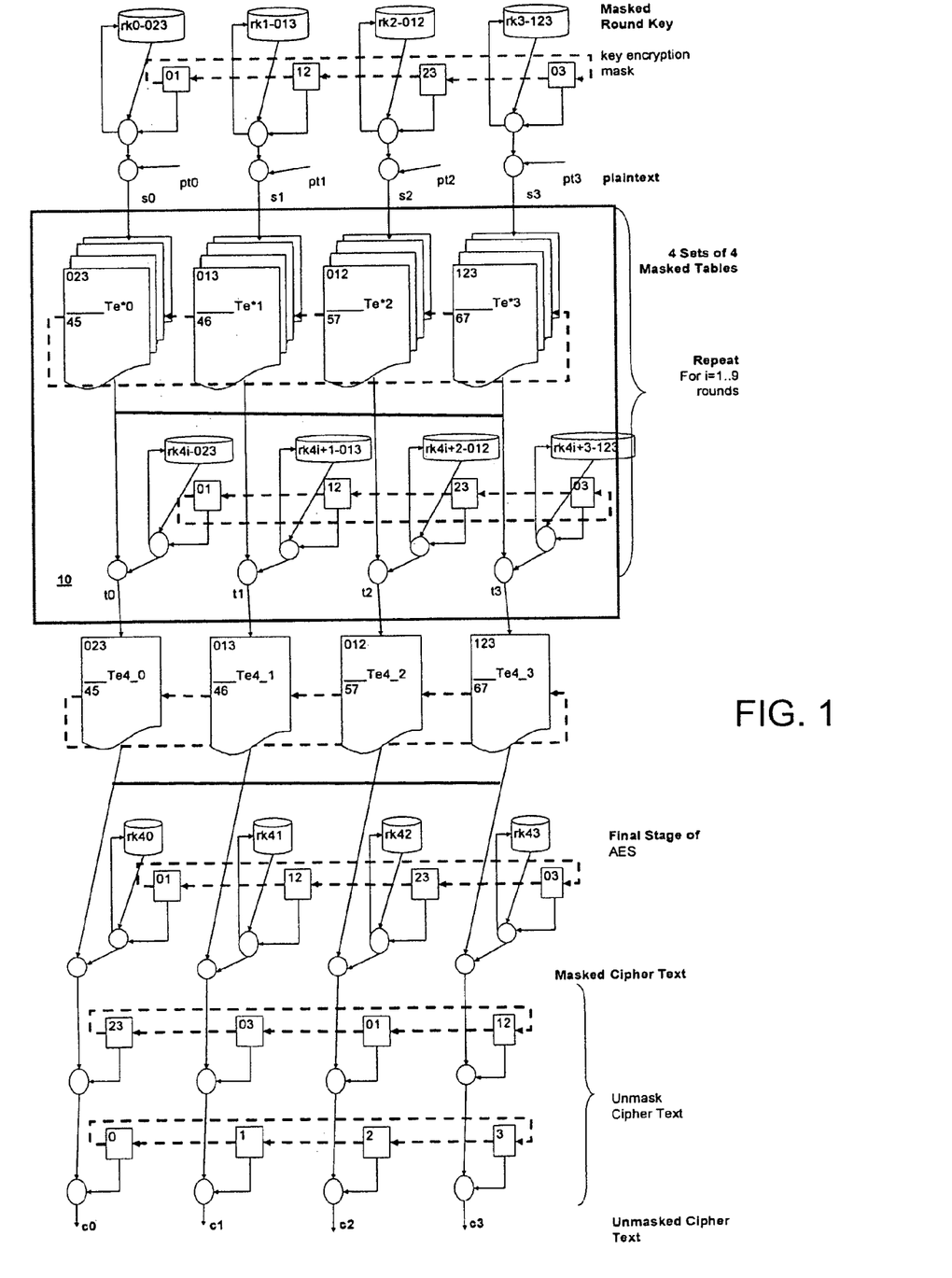
FIG. 1 is a block diagram showing substitution tables and masking in accordance with the preferred embodiment as applied to AES encryption.

According to the preferred embodiment, full random masking of table outputs is supported. FIG. 1 is a block diagram that shows an example of the preferred embodiment as applied to AES encryption steps (using table implementation of AES for high performance as described in Dr. Brian Gladman, "A Specification for Rijndael, the AES Algorithm", at fp.gladman.plus.com/cryptography_technology/rijndael/aes.spec.311.pdf, 15 Apr. 2003 (pages 18-19)). FIG. 1 depicts XOR operations in the following three ways: circles represent XORs on input values resulting in an output value; bold horizontal lines similarly designate an XOR process; numerals shown associated with round keys in the figure designate XOR masking, as is described below.

In the example of the preferred embodiment given in FIG. 1, there are four different randomly defined masking values. These are denoted 0, 1, 2, 3 and the exclusive or of these values is denoted by the numerals listed in series. For example, in FIG. 1 the XOR of mask 1 and mask 3 is denoted "13" and the XOR of mask 0 and mask 1 is denoted "01". As indicated, the four mask values are randomly defined using techniques known in the art. A further set of output mask values are denoted 4, 5, 6, 7 and are referred to in more detail below.

The example AES encryption illustrated in FIG. 1 includes masking of AES round keys and masked AES substitution tables where masks are used at both the inputs and outputs of the substitution tables (S-boxes). There is a final unmasking of the cipher text at the completion of the AES encryption. According to the AES encryption process shown in the example, for a 128-bit key there are four different 32-bit round keys defined. This implementation is suitable, for example, where the processor executing the AES operations is a 32-bit processor. FIG. 1 shows these four initial round keys as rk0, rk1, rk2, rk3. In the example of the preferred embodiment, each of the round keys is masked by a different combination of three of the mask values.

Thus the masked round keys are shown in FIG. 1 as rk0-023, rk1-013, rk2-012, rk3-123, where the numerals following the dash indicate the exclusive or of the three mask values denoted. In the example, round key rk0 is masked with the exclusive or of masks 0, 2 and 3 (shown as "rk0-023"). As will be appreciated, the set of masked round keys may be defined with other combinations of mask values. However, the masks applied to the round keys are chosen to permit appropriate key encryption masks and masked tables to be defined, as described in more detail for the example of FIG. 1.

In the example cryptographic operation shown in FIG. 1, four sets of four masked tables are shown. Each of these tables is indexed by an 8-bit input value and has a 32-bit output value. It therefore will be understood by those skilled in the art that the input mask of the set of masked tables is a byte (an 8-bit value). In the preferred embodiment example shown in FIG. 1, each of the 4 bytes of an individual 32-bit round key has the same mask byte. This permits the proper masking of the substitution tables to be carried out to allow access by the (masked) 4 bytes of the 32-bit plaintext segments that are shown as s0, s1, s2, s3 in the example of FIG. 1.

Round keys rk0, rk4, rk8 . . . rk40 are represented in the above notation by "rk4$i$". For example, for $i=0, \ldots, 10$ there are 44 round keys (rk0,rk1, . . . , rk43) referred to in FIG. 1. Round keys denoted by 4$i$, 4$i$+1, 4$i$+2, 4$i$+3 shown in FIG. 1 have different masks. In the preferred embodiment, round keys denoted by rk4$i$ all have the same mask and similarly for each of the set of round keys rk4$i$+1 (and similarly for set rk4$i$+2 and for the set rk4$i$+3). Using two or more masked substitution tables, the first four round keys, rk0, rk1, rk2, rk3, will have different masks. Hence an attacker who determines one mask and has access to the masked round keys will not be able to consequently obtain all 128 bits of the master key and all round keys. This is unlike approaches in which the same mask is used for all round keys during the invocation of the cryptographic process. In such approaches, when the mask is determined by an attacker, the entire master key is placed at risk.

The approach of the preferred embodiment utilizes key encryption masks and masks applied to the substitution tables that are defined to be non-uniform. As is described, the non-uniformity may be achieved by defining each of the masks to be uniquely different or alternatively the non-uniformity may be achieved by defining sets of masks. In the latter case, each mask within a set may be uniform but the masks in different sets differ. As the description of the preferred embodiment indicates, the key values in the cryptographic process are split and the non-uniform key encryption masks and non-uniformly defined masked tables are used for different portions of the split key values.

As will be appreciated by those skilled in the art, different masking schemes are also possible. For example one could use the same 32-bit mask for all round keys but apply (non-uniform) portions of the mask to each key. In this case, each byte of the mask is defined to be different from the other bytes and is defined to correspond to the input mask of one set of masked substitution tables.

As shown in FIG. 1, each of the masked round keys is masked with a key encryption mask. A key encryption mask is applied to an initial set of round keys before plaintext values are combined with the masked key round key values. In the preferred embodiment there is a set of four key encryption masks. FIG. 1 shows these values as being the results of exclusive or operations on mask values 0 and 1, 1 and 2, 2 and 3, and 0 and 3 for the four masked round keys rk0-023, rk1-013, rk2-012 and rk3-123, respectively. FIG. 1 shows the key encryption mask values being capable of being rotated, as denoted by the dashed line with arrows that connects the four key encryption mask values in the figure. The manner in which these values are rotated in the preferred embodiment is described in more detail below.

The example shown in FIG. 1 includes the exclusive or of the round keys, as masked, with a plaintext value. In the AES process, as is shown in FIG. 1, a 128-bit plaintext value is split into 4 32-bit values (pt0, pt1, pt2, pt3 in FIG. 1). Each of these exclusive or results (s0, s1, s2, s3 in FIG. 1) is then input into a repeated process shown schematically in box 10 in FIG. 1. In the example shown, s0 is divided into 4 8-bit parts. Each 8-bit portion of the 32-bit input value is used to index one of the set of four associated look up tables. For example, one byte of s0 is used as input for one of the tables shown below it in the Figure (Te*0 in FIG. 1). Similarly, one byte of s1 is input for one of the tables Te*1, as shown in FIG. 1.

The example of the preferred embodiment illustrated in FIG. 1 includes a master key having 128 bits. This master key is used to create 44 32-bit round keys (where the first 4 round keys is equivalent to the 128-bit master key according to the AES (or Rijndael) specification). In the example, the round keys are split into 8-bit parts (bytes), treating each with a specific mask. Within each AES round, there are 4 round keys and the masking scheme may utilize different byte masks within a round key, or different word masks of each round key. Further, different rounds may use different masking schemes.

For example, if A,B,C,D, each represents an 8-bit mask (or byte masks) and there are 4 masked sets of S-box table sets, each set of tables will have a corresponding input mask A, B, C or D and a different 32 bit output mask. If there are four round keys producing inputs to the four S-box tables (as shown by s0,s1,s2,s3 in FIG. 1) then the mask on rk0 may be defined as DCBA. In a similar manner the mask on rk1 is CDAB, mask on rk2 is BADC and mask on rk3 is ABCD. As may be seen, all byte masks within one round key are different and round key word masks are also different. The exclusive-or of the four tables according to AES specification, given here $$s0 = pt0 \hat{~} rk0; \quad s1 = pt1 \hat{~} rk1; \quad s2 = pt2 \hat{~} rk2; \quad s3 = pt3 \hat{~} rk3$$

$$t0 = Te0(s0_{31\ldots 24}) \hat{~} Te1(s1_{23\ldots 16}) \hat{~} Te2(s2_{15\ldots 8}) \hat{~} Te3(s3_{7\ldots 0}) \hat{~} rk4$$

$$t1 = Te0(s1_{31\ldots 24}) \hat{~} Te1(s2_{23\ldots 16}) \hat{~} Te2(s3_{15\ldots 8}) \hat{~} Te3(s0_{7\ldots 0}) \hat{~} rk5$$

$$t2 = Te0(s2_{31\ldots 24}) \hat{~} Te1(s3_{23\ldots 16}) \hat{~} Te2(s0_{15\ldots 8}) \hat{~} Te3(s1_{7\ldots 0}) \hat{~} rk6$$

$$t3 = Te0(s3_{31\ldots 24}) \hat{~} Te1(s0_{23\ldots 16}) \hat{~} Te2(s1_{15\ldots 8}) \hat{~} Te3(s2_{7\ldots 0}) \hat{~} rk7$$

produces masks at output tables which cancel. This may be seen by considering value t0 defined in the above equation. The value t0 utilizes 4 tables (Te0,Te1,Te2,Te3) with input masks DDDD. This may be seen as the mask on rk0 (and s0) is DCBA, $S0_{31\ldots 24}$ refers to the first byte in s0, which is D, consequently this is the first D of the DDDD input mask of tables reflected in the equation defining t0, above. As may be seen, t1 utilizes input table masks CACA, t2 utilizes input table masks BBBB and t3 utilizes input table masks ACAC.

In the preferred embodiment example shown in FIG. 1, masked round key values are replaced by the resulting values after the key encryption mask values have been applied to the masked round keys. As is described in more detail below, according to the preferred embodiment there are different ways in which rotation of key encryption mask values may be carried out. It will be seen from the example shown in FIG. 1, however, that the replacement of the masked round keys will result in an effective re-masking of the masked round keys. The re-masking is carried out in a way that is synchronized with the rotation of key encryption masks and masked tables. In this manner, it is possible to retain only a single masked round key value for each of the round keys used in the cryptographic process. The value is continually re-masked according to the process of the preferred embodiment.

FIG. 1 shows four sets of four masked tables in the repeated steps of box 10. In the AES process, there is provided a single set of four tables (Te*, where * represents the set of four Sbox tables, Te0, Te1, Te2, Te3, used in all but the last round of AES, and Te4, only used in the last round ). In the process shown in FIG. 1, there are four sets of tables—denoted Te*0, Te*1, Te*2, Te*3. The substitution tables (S-box tables or S-boxes) shown in FIG. 1 are defined based on substitution tables defined in accordance with the AES process. The tables Te*0, Te*1, Te*2, Te*3 are, in the preferred embodiment, masked with both an input mask and with an output mask, each of these input masks is a combination of the four masks 0, 1, 2, 3 used in the different masking operations described. The combinations used for the input masks for the S-boxes are related to the combinations of masks used for the initial masked round key and to the combinations used for the key encryption mask. Each of these interrelated masking combinations is selected to ensure that the output of the masked AES cryptographic operation is not altered by the masking operations carried out on the intermediate values used in the process.

The input and output masking is implemented by altering the values in the look up tables Te*0, Te*1, Te*2, Te*3 such that, for a table T indexed by the value i (entries being denoted by T(i)), where T(i)=j, the identity $M_t(i \hat{~} m_{in}) = j \hat{~} m_{out}$ is true where $m_{in}$ is the input mask value, $m_{out}$ is the output mask value and $M_t(i \hat{~} m_{in})$ is the masked table value. In the preferred embodiment, when a device with limited processor or memory resources carries out cryptographic processes, these masked sets of tables are pre-computed and downloaded to the device before the cryptographic processes are invoked on the device.

In the example of FIG. 1, each of the four tables referred to as Te*0 is masked at its input by the combination of the three masking values 0, 2, 3. The tables have an output masking value given by the XOR of the two output masking values. As indicated, the output values of the masked tables are 32-bits. The output masks used at the output of the masked substitution tables (denoted 4, 5, 6, 7 in the example of FIG. 1) are not related to the input masks of the masked substitution tables, or key encryption masks or masks of round keys. As will be seen from the example of FIG. 1, in the preferred embodiment the output masks for the sets of masked tables are defined so as to effectively cancel each other (as described below, the output of the tables are exclusive or'd together and the values of the output masks are selected such that the exclusive or of the mask values cancels out the effect of the masks).

As will be appreciated, it is not required that the output masks for the masked tables need be defined to cancel each other out. However, where the masks are not so defined, the definition of the input values for the masked tables is altered to account for the values of the output masks. It will be further appreciated that the masking of the key values with the key encryption mask values does not require output table masking. The preferred embodiment includes such masking as the resistance to DPA attacks is increased when input and output masking of table values is provided.

The index or input values for the four sets of tables Te*0, Te*1, Te*2, Te*3 are the four values s0, s1, s2, s3 as shown in FIG. 1. The figure also shows by the bold horizontal line connecting the outputs of the four sets of tables that the output values of the look up tables form four exclusive or's according to the AES implementation using tables from (Dr. Brian Gladman, "A Specification for Rijndael, the AES Algorithm", at fp.gladman.plus.com/cryptography_technology/rijndael/aes.spec.311.pdf, 15 Apr. 2003 (specifically see pages 18-19)). The four results are then subject to four exclusive or operations with a new set of round keys, masked with corresponding key encryption masks.

As referred to above, FIG. 1 shows rotation of key encryption masks by a set of dashed lines. Similarly, in box 10, potential rotation of masked tables and of the further set of key encryption masks is shown by respective sets of dashed lines.

As indicated in FIG. 1, the steps of indexing into the masked tables and further masking with masked round keys are carried out nine times (for i=1 . . . 9 rounds). It will be understood by those skilled in the art that the output from box 10 (shown as t0, t1, t2, t3) is used as input for the masked tables (s0, s1, s2, s3) for each new iteration of the steps in box 10 of FIG. 1.

At the conclusion of the iterations of steps shown in box 10, the four outputs are input into a final set of masked tables: the fourth table in the set Te*0, Te*1, Te*2, Te*3 (ie where the value of the placeholder * is 4). These four tables, as indicated in FIG. 1, are also potentially rotatable in the approach of the preferred embodiment. The outputs of these table look-ups are then exclusive or'd together and the resulting values are masked in the final AES stage. In this stage, the round keys rk40, rk41, rk42, rk43 are combined with the key encryption masks (also shown as being rotatable).

In a final set of steps, the cipher text is unmasked by applying the initial masks that defined the masked round keys rk0-023, rk1-013, rk2-012, rk3-123. To provide additional protection from attacks, these unmasking steps are carried out in two parts so that the combined masking values (023, 013, 012, 123 in the example of FIG. 1) are not directly calculated in carrying out the process of the preferred embodiment. The unmasking values are shown as being rotatable in FIG. 1, as was the case with key encryption masks and masked tables, as described above. The rotation of the values used in the unmasking steps matches the effective rotation of the initial masking of the round keys carried out by replacement of the masked round keys, as described above. As will be appreciated, the number and order of unmasking steps may be variously defined. The unmasking values may be described as tuples, where each tuple corresponds to one of the initial masks applied and where combinations of the values in the tuple are applied in two or more unmasking steps to effectively cancel the initial masking step.

The result is a set of four 32-bit cipher text values c0, c1, c2, c3 that are encrypted using the AES encryption process.

As indicated in the above description, and as shown in FIG. 1, the approach of the preferred embodiment includes rotation of masking values and tables. The rotation of such values and tables is implemented in the preferred embodiment by an identifier or pointer that specifies which tables and masking values are to be applied from the available selection. One pointer is used per round and points to the address of current set of tables and key encryption masks for the first round key for that round. The other three round keys for the round use the single pointer and an appropriate offset to identify the appropriate tables and mask values. In the preferred embodiment, the implementation of the data structures for the tables and mask values includes the use of doubly-linked lists.

An efficient way to manage the offset and storage of table values and masking values is to store the key encryption masks and addresses of the set of masked substitution tables, in order, in a memory device. The offset calculation from the first round key is therefore a straightforward one. Similarly, the addresses to the set of tables Te*0, Te*1, Te*2, Te*3 are stored in order in memory.

The rotation of the masking values and tables is carried out in accordance with a randomized selection of one of a plurality of modes of operation. In the example of the preferred embodiment shown in FIG. 1, there are four modes of operation:

a. Increment mode: for each AES round, where increment is selected, the round-key encryption masks and set of tables are shifted to the left (as shown in FIG. 1; the key encryption masks and tables associated with round keys n are replaced by those previously associated with round keys n+1, taken mod 4 in the example of the preferred embodiment such that the values wrap) and then the round key is exclusive or'd with the key encryption mask and the set of masked tables is accessed for performing the AES look-up;

b. Decrement mode: the round keys are exclusive or'd with the key encryption masks and tables and key encryption masks are shifted to the right (the key encryption masks and tables associated with round keys n are replaced by those previously associated with round keys n−1, taken mod 4 in the example of the preferred embodiment such that the values wrap) and the set of masked tables is accessed; and c. No change mode: there is no masking using the key encryption masks and no shift of the tables or key encryption masks and the set of masked tables is accessed.

d. Increment by 2 mode: for each AES round, where increment by 2 is selected, the round-key encryption masks and set of tables are shifted to the left (as shown in FIG. 1) and then the round key is exclusive or'd with the key encryption mask. Next the round-key encryption masks and set of tables are shifted to the left again and then the round key is exclusive or'd with the key encryption mask. Finally the set of masked tables is accessed for performing the AES look-up;

As will be appreciated, the security of a cryptographic operation is enhanced by the rotation of the key encryption masks and the masked tables. For example, even if the attacker can determine from power or electromagnetic analysis when an 'increment by 2 mode' rotation has been performed, the resulting mask on the round key will be different from previous masks on the same round key which used the same 'increment by 2 mode' rotation. Hence the rotation scheme does not directly lead to information on the masking since the masking is state-dependent. This is unlike previous schemes, where newly masked round key are directly accessed as the result of executing statements to select between alternative round keys (possibly using case statements). In such previous schemes, power analysis information identifying the executed statements (for example, which case is selected) will directly provide information on power traces which use the same masks of the round key. Such schemes choose maskings independent of previous masking (hence they are not state-dependent, ie. dependent on the previous state or mask of round key used in a previous invocation of a cryptographic process). In these other approaches, a first order DPA of the selected power traces at the output of S-boxes may be used to discover the round key value.

In the preferred embodiment a key encryption mask creates a different resultant mask on the round key depending upon the previous mask value of the round key. Further, where as described above the rotation is defined in a random manner, the security is further enhanced. The four example shift modes described above may be specified by a two-bit value that is randomly generated for each round of the AES process (or each iteration of the cryptographic process). As long as the shift of key encryption masks and masked tables is carried out in a synchronized manner, the shifting will not affect the output of the masked cryptographic process. This randomized rotation of the masks and masked tables operates, however, to make an attack on the cryptographic process more difficult.

As will be appreciated by those skilled in the art, different rotational schemes are also possible. For example, the round keys may be split into two groups of two each and a rotation of masks and tables may be defined for each of the two groups. Further, such an approach may be incorporated with the shifting of masks and tables over the entire set of four round keys such that the rotation will vary between a rotation over the full group and a rotation defined over the two subsets.

The combinations of rotational schemes and of mask definitions may be selected based on security requirements and resource availability of the system in which the countermeasures of the preferred embodiment are utilized. Increased complexity of mask and rotational scheme definition will increase security but will require additional overhead in system resources and time.

The input and output mask definition may be selected in accordance with security and system requirements. With respect to output masks, the output masks of the tables that are exclusive or'd together may be defined to cancel, as is described above. For example, in FIG. 1 the mask outputs 45,46,57,67 cancel out so that no mask is left, after the exclusive or operation is carried out (as shown by the bold horizontal line in box 10 the figure). As will be appreciated by those skilled in the art, alternatively the output masks may be defined to collectively result in a fixed mask and the definition of the input masks of the masked substitution tables and round keys mask will be appropriately modified to reflect the fixed mask selected. A further alternative is for two or more sets of masked substitution tables to be supported where either the masks cancel or create a fixed mask which is incorporated into the mask of round keys and input mask of the substitution tables.

The rotation of masks and tables described with reference to FIG. 1, based on the four modes set out, advantageously may be implemented using limited memory and power resources and is therefore well-suited to a mobile computing device implementation in which memory and power constraints are significant in cryptographic operations.

Figure 2:
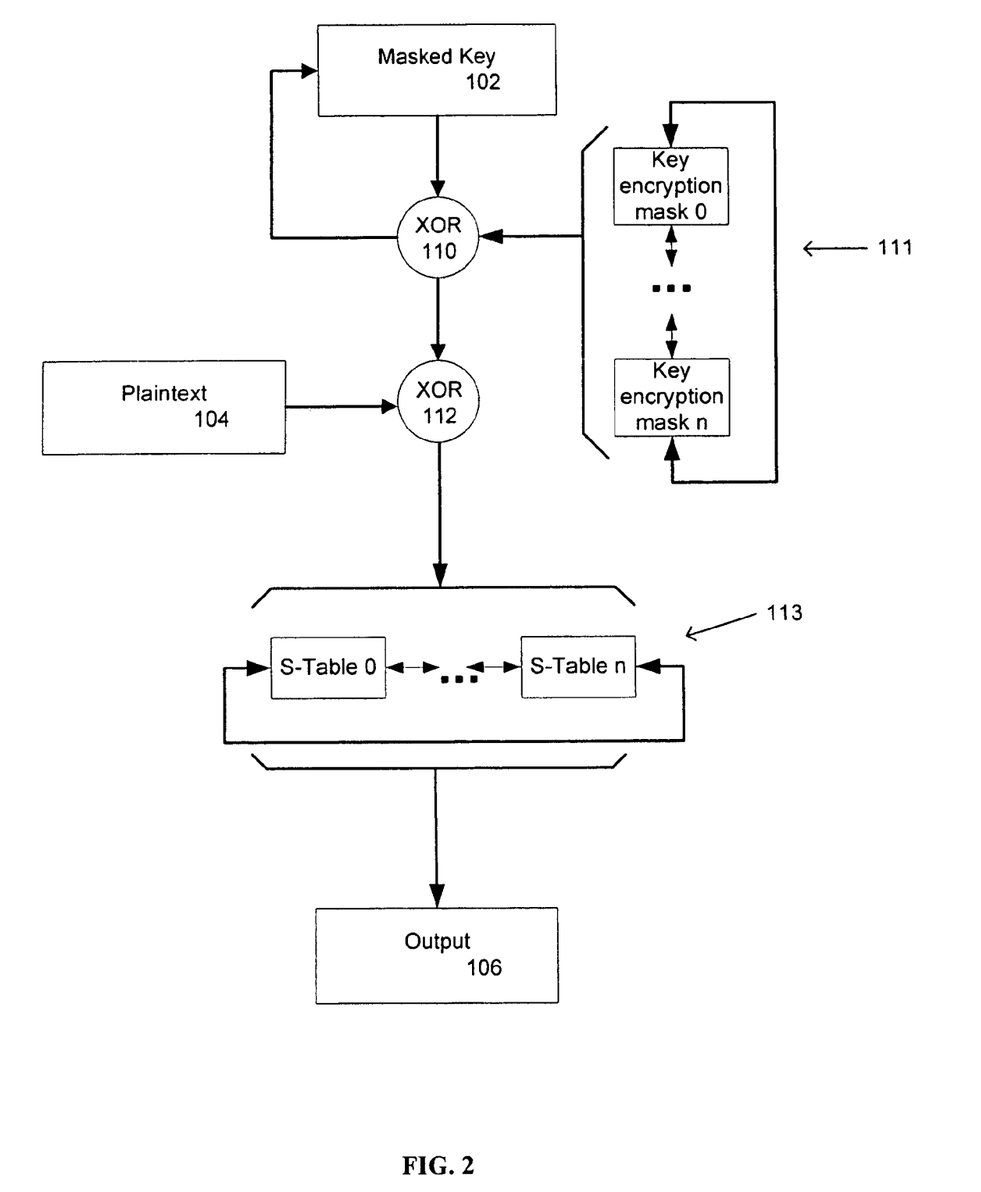
FIG. 2 is a block diagram showing a high-level depiction of masking carried out in the preferred embodiment.

The above description describes the masking of keys and tables used in the AES encryption processes in accordance with the preferred embodiment. FIG. 2 is a block diagram illustrating, at a high level of abstraction, the masking steps carried out in the preferred embodiment. In FIG. 2 masked key 102 (initially masked key value rk) is shown, along with plaintext 104 and output 106. In the generalized encryption process depicted in FIG. 2, masked key 102 is masked at exclusive or 110 by a key encryption mask selected from a set of key encryption masks 0 . . . n (set 111). Plaintext 104 is masked with the resultant value at exclusive or 112. The product is then used as input to one of a selected S-table from a set of masked S-tables 0 . . . n (113), with the output being shown as output 106.

The simplified encryption process shown in FIG. 2 illustrates the rotation of key encryption masks. Key encryption masks 0 . . . n (111) are shown as potential input for exclusive or 110. Similarly, masked S-tables 0 . . . n are shown as being potentially indexed by the output of exclusive or 112. As was described above in detail with respect to the AES implementation of the preferred embodiment, the set of key encryption masks and the set of masked S-tables are defined so that the members of each set correspond such that output 106 has a predictable value. In other words, output 106 may, in some implementations be the same as if there had been no masking of the key or the S-tables. In an alternative implementation, output 106 will vary from the unmasked S-table encryption but that variation will be in a known way that may be corrected or allowed for in subsequent operations performed on or with output 106.

FIG. 2 shows the manner in which masked key 102 is masked by the key encryption masks. The value of masked key 102 that would otherwise be used in the encryption process is effectively replaced by the output of exclusive or 110. In this manner, the masked key used in the encryption is defined with relation to the previous value of masked key 102. The new masked key value is state-dependent in this way.

FIG. 2 also shows that the members of the set of key encryption masks 0 . . . n are able to be rotated as they are applied to masked key 102 (at exclusive or 110). Similarly, S-tables 0 . . . n are rotated in a synchronized manner.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. A computing device-implemented method for improving the resistance, to power analysis attacks, of a processing unit performing iterative cryptographic operations utilizing key values and substitution tables, the method utilizing masking of the key values and the substitution tables, the method comprising the steps of:

a) initially masking an initial key value,
b) initially defining a set of non-uniform key encryption masks,
c) initially defining a set of masked substitution tables, each masked substitution table being derived from an initial substitution table so as to correspond to one of the key encryption masks from the set of non-uniform key encryption masks,
d) iteratively carrying out the cryptographic operations, such that
  each iteration of the cryptographic operations comprises the step of defining a successive masked key value by masking the previous masked key value using a key encryption mask selected from the set of non-uniform key encryption masks, and
  each iteration of the cryptographic operations utilizes the successively defined masked key value and the corresponding table from the set of masked substitution tables that corresponds to the selected key encryption mask.

2. The computing device-implemented method of claim 1 in which the step of defining a successive masked key value comprises the step of selecting a key encryption mask from the set of key encryption masks by randomly selecting a mode for stepping through the set of key encryption masks from one of: increment mode, decrement mode, no change mode and double increment mode.

3. The computing device-implemented method of claim 1 in which each successively defined masked key value is comprised of split key values and the set of key encryption masks is defined to permit masking of each one of the split key values.

4. The computing device-implemented method of claim 3 in which the iterative cryptographic operations are rounds and in which the split key values are split round key values.

5. The computing device-implemented method of claim 4 in which the rounds are rounds in an Advanced Encryption Standard process or in a Data Encryption Standard process.

6. A computing device-implemented method for successively masking a key value, the successively masked values being for use by a processing unit performing successive iterations of cryptographic operations utilizing a substitution table, the method comprising the initial steps of:

a) splitting the key value into a set of split key values,
b) defining a set of random mask values,
c) combining multiple random mask values to define non-uniform key encryption masks
  and masking the set of split key values with selected key encryption masks to define a set of masked keys for use in the iterative cryptographic operations, and
d) combining multiple random mask values related to the key encryption masks to define non-uniform table masks and generating a set of masked tables derived from the substitution table and corresponding to the set of split key values, for use in the iterative cryptographic operations, the method further comprising, for each iteration of the cryptographic operation, the step of utilizing selected key encryption masks and masked tables, the selection being carried out by a rotation through the respective sets of key encryption masks and masked tables.

7. The method of claim 6, in which the step of selecting the elements in the set of key encryption masks and the set of masked tables further comprises random selection of a mode of rotation from a set of potential rotation modes.

8. The method of claim 7 in which the set of potential rotation modes includes two or more of increment, decrement, no motion and double increment modes.

9. The method of claim 6 in which the masking to generate the masked tables is an input masking, the method further comprising the step of defining output masks for each of the masked tables, the values of the output masks being defined such that the output masks cancel when used in the cryptographic operations.

10. The method of claim 6 in which the definition of the key encryption mask comprises the steps of a) defining a set of non-uniform initial mask values for application to the split mask values,
b) defining a set of non-uniform rotational mask values, the rotational mask values being applied after the initial mask values and the resulting masked values being available to replace the set of masked key values, and
c) defining a set of tuples of unmasking values defined such that in combination, the tuples of unmasking values cancel each of the initial mask values.

11. The method of claim 6 applied to an AES cryptographic operation.

12. A computing device program product for carrying out iterative cryptographic operations utilizing an initial key value and a substitution table, the computing device program product comprising a computer device usable storage medium having computer device readable program product code stored in said medium, and comprising a) program code operative to initially mask the initial key value,
b) program code operative to initially define a set of non-uniform key encryption masks,
c) program code operative to initially define a set of masked substitution tables, each masked substitution table being derived from the initial substitution table so as to correspond to one of the set of key encryption masks, and
d) program code operative to carry out each iteration of the cryptographic operations by defining a successive masked key value by masking the previous masked key value using a key encryption mask selected from the set of key encryption masks, and to carry out each iteration of the cryptographic operations utilizing the successively defined masked key value and the corresponding table from the set of masked substitution tables.

13. The computing device program product of claim 12 in which program code operative to define a successive masked key value further comprises program code operative to select a key encryption mask from the set of key encryption masks by randomly selecting a mode for stepping through the set of key encryption masks from one of:

increment mode, decrement mode, no change mode and double increment mode.

14. The computing device program product of claim 12 further comprising program code operative to successively define masked key values by defining split key values and further comprising program code operative to define the set of key encryption masks to permit masking of each one of the split key values.

15. The computing device program product of claim 14 in which the program code operative to carry out the iterative cryptographic operations is operative to carry out cryptographic rounds and in which the program code operative to define split key values is operative to define split round key values.

16. The computing device program product of claim 15 in which the program code operative to carry out cryptographic rounds is operative to carry out rounds in an Advanced Encryption Standard process or in a Data Encryption Standard process.

17. A computing device program product for successively masking a key value, the successively masked values being for use in successive iterations of cryptographic operations utilizing a substitution table, the computing device program product comprising a computing device usable storage medium having computing device readable program product code stored in said medium, and comprising program code operative to split the key value into a set of split key values, program code operative to define a set of random mask values, program code operative to combine multiple random mask values to define non-uniform key encryption masks and to mask the set of split key values with selected key encryption masks to define a set of masked keys for use in the iterative cryptographic operations, program code operative to combine multiple random mask values related to the key encryption masks to define non-uniform table masks and to generate a set of masked tables derived from the substitution table and corresponding to the set of split key values, for use in the iterative cryptographic operations, and program code operative to carry out each iteration of the cryptographic operation by utilizing selected key encryption masks and masked tables, the program code being operative to carry out the selection by rotating through the respective sets of key encryption masks and masked tables.

18. The computing device program product of claim 17 in which the program code operative to generate the masked tables is operative to generate input masking, the program code further comprising program code operative to define output masks for each of the masked tables, the values of the output masks being defined such that the output masks cancel when used in the cryptographic operations.

19. The computing device program product of claim 17 in which the program code operative to define the key encryption mask further comprises a) program code operative to define a set of non-uniform initial mask values for application to the split mask values, b) program code operative to define a set of non-uniform rotational mask values, the rotational mask values being applied after the initial mask values and the resulting masked values being available to replace the set of masked key values, and c) program code operative to define a set of tuples of unmasking values defined such that in combination, the tuples of unmasking values cancel each of the initial mask values.

20. A computing device comprising a memory medium for storing program code executable on the computing device, the memory medium of the computing device storing program code executable on the computing device for carrying out the method of claim 1.

* * * * *